United States Patent [19]

Schoettle et al.

[11] Patent Number: 4,769,731
[45] Date of Patent: Sep. 6, 1988

[54] RECORDING MEDIUM WITH AN ENVELOPE, AND AN IDENTIFICATION PART THEREFOR

[75] Inventors: Klaus Schoettle, Heidelberg; Dietrich Gruehn, Appenweier; Kurt Schmidts; Heinz Berger, both of Kehl; Helmut Kreissler, Oberkirch, all of Fed. Rep. of Germany

[73] Assignee: BASF Aktiengesellschaft, Ludwigshafen, Fed. Rep. of Germany

[21] Appl. No.: 833,380

[22] Filed: Feb. 27, 1986

[30] Foreign Application Priority Data

Mar. 1, 1985 [DE] Fed. Rep. of Germany ... 8505795[U]

[51] Int. Cl.$^4$ .............................................. G11B 23/02
[52] U.S. Cl. ....................................... 360/132; 360/60
[58] Field of Search ......................... 360/60, 132, 133; 242/197–200; 206/444

[56] References Cited

U.S. PATENT DOCUMENTS

| 4,041,537 | 8/1977 | Kishi | 360/60 |
| 4,380,030 | 4/1983 | Shiba | 360/60 |
| 4,530,017 | 7/1985 | Oishi et al. | 360/60 |
| 4,536,812 | 8/1985 | Oishi et al. | 360/133 |
| 4,618,060 | 10/1986 | Tarter | 360/60 |
| 4,626,949 | 12/1986 | Brock et al. | 360/133 |

FOREIGN PATENT DOCUMENTS

| 0045186 | 2/1982 | European Pat. Off. | 360/60 |
| 0218085 | 12/1983 | Japan | 360/132 |

Primary Examiner—Stuart N. Hecker
Assistant Examiner—David J. Severin
Attorney, Agent, or Firm—Keil & Weinkauf

[57] ABSTRACT

A recording medium possessing an envelope has at least one identification part which is mounted so that its position can be altered but it cannot be accidentally lost, and which is symmetrical about at least one axis, in particular a middle axis, and is associated with at least one wall of the envelope. To permit error-free assembly/handling, the identification part advantageously has a shape which permits at least two equivalent mounted positions on the envelope.

2 Claims, 3 Drawing Sheets

RECORDING MEDIUM WITH AN ENVELOPE, AND AN IDENTIFICATION PART THEREFOR

The present invention relates to a recording medium which possesses an envelope associated therewith and a part which is mounted detachably on the envelope and whose position can be altered and which is intended for identifying the recording medium or its recording, the envelope and the identification part being provided with interengaging means to prevent accidental detachment of the identification part from the envelope and the identification part itself.

Recording media, in particular magnetic recording media, are generally used for data storage or the recording of audio/video signals in the form of disks or tapes protected in suitable plastic shells, casings or other envelopes. In this case, the shells could be connected inseparably to encase the recording medium in a housing, so that the shells are not separated during the recording/playback operation. To prevent recorded signals from being accidentally erased or overwritten, virtually all systems have an erase and/or write protection. This may consist of, for example, a lug which can easily be broken out of the housing, or the housing may contain separate parts which close or open an opening in the housing by rotation or displacement. It is also possible for identifiers which show the content or nature of the particular recording medium and whose position can be altered to be mounted on the shell.

For the purposes of the present invention, erase or write protectors and identifiers are to be referred to as identification parts.

During assembly, and as long as the halves of the shell are not closed, identification parts which have not been molded integral with the shell are arranged more or less loosely in recesses in the particular half of the housing. In the case of miniaturized magnetic recording media, such as the 8 mm cassette or the 3.5 inch FlexyDisk®, the identification parts and the housing recesses are so small that the identification parts frequently fall out of the housing half during assembly as a result of shocks due to movement of the automatic assembly machines, resulting in expensive interruptions to operation, or giving wrongly assembled products leading to complaints. FlexyDisk® is a registered trademark of BASF Aktiengesellschaft, Ludwigshafen.

It is an object of the present invention to provide recording media with envelopes which possess identification parts which are easy to mount and to handle, simple to produce and cannot be lost.

The present invention is not limited to envelopes which are inseparably connected to the recording medium as is the case with most cassettes and diskettes. It can also advantageously be applied to video diskettes in which the envelope is separated from the recording disk in the apparatus.

We have found that this object is achieved, according to the invention, by an identification part which consists of at least two identical parts, a part of the element engaging a wall of the envelope in its mounted position.

In a practical embodiment, the identification part may have an N-shaped or S-shaped cross-section. This makes it symmetrical about one cross-sectional axis, which greatly simplifies assembly by automatic machines since there is no longer a correct side to be observed in respect to feed and assembly. It is also possible in practice to use an identification part having a w-shaped or E-shaped cross-section.

It is also advantageous to provide one or more inward-projecting locking extensions on the free ends of the identification part.

Embodiments of the invention are described below with reference to drawings.

Figure 2A:
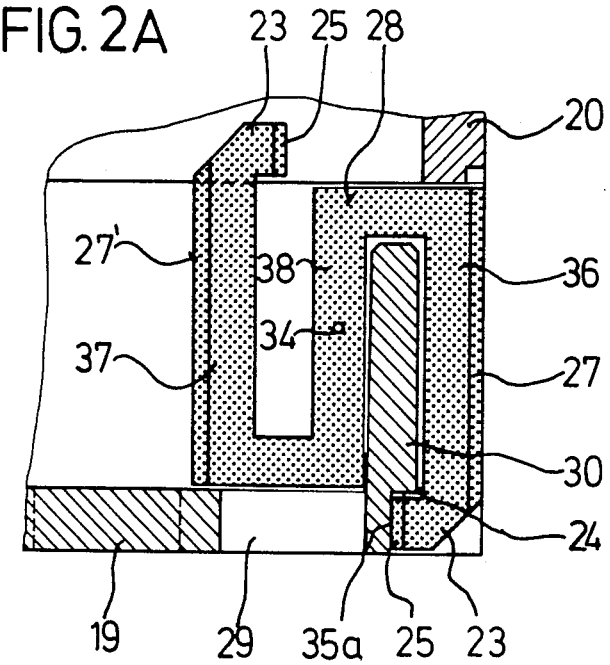
FIGS. 2A and 2B show a novel write protection for a small cassette in another embodiment.
Figure 2B:
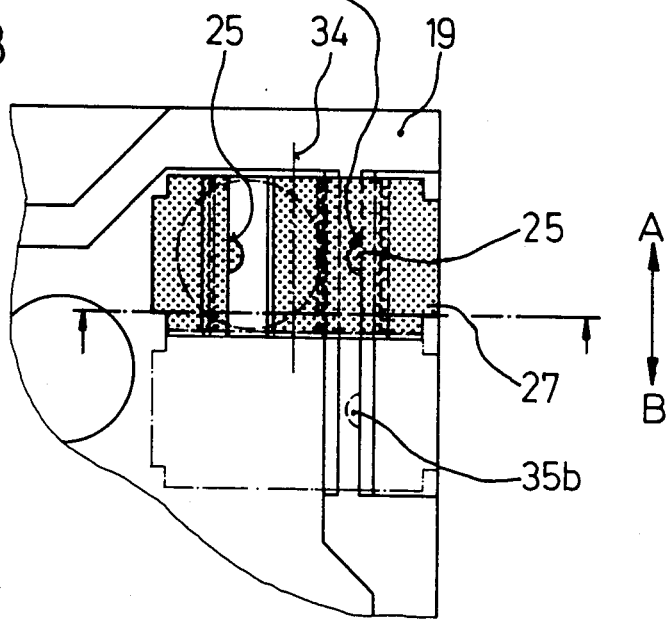
Figure 3:
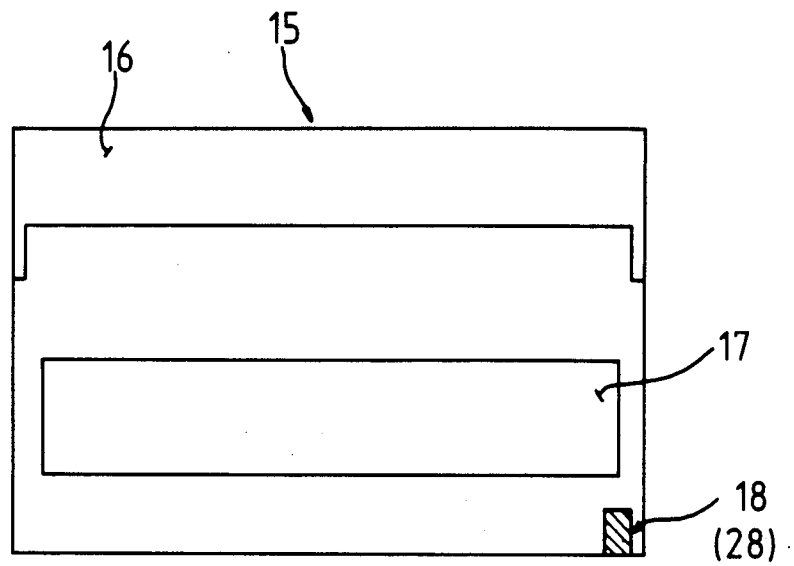
FIG. 3 shows the position of the identification part in the cassette.

FIG. 3 shows a small cassette 15 having a swivel flap 16, a window 17 and an identification part 18 (referred to below as I part for short). The small cassette may be, for example, an 8 mm video cassette. The housing of the cassette is formed by bottom part 19 and lid part 20 (see FIGS. 1A, 1B and 2A, 2B). Reference numeral 30 denotes a rear wall of the lower part 19, and reference numeral 29 designates an opening in the bottom part through which the position of the I part 18 or 28 can be scanned.

In FIG. 1, the I part 18 has an approximately N-shaped cross-section and possesses free arms 31 and 32 which are connected via a middle part 33, part of which is oblique. The ends of the arms can be provided with projections 25 which preferably extend within the outline of the N form and, for example, do not project beond this. The ends of the oblique section of the middle part 33 may likewise be equipped with projections 21 which face the said projections 25. When inserted into the cassette 15 (i.e. during assembly), the middle part 33 and one arm 31 grip the rear wall 30 over its full height and relatively closely so that the free end of the arm rests with its end face on the bottom part 19. The rear wall 30 is provided with grooves 26a and 26b or corresponding notches for fixing the positions of the I part.

A housing lip 22 is located on the inside of the wall 30 and projects in the shape of a wedge toward the bottom part 19, ending, at the height of the projection 21, above the surface of the bottom part 19. When the I part 18 is inserted into the housing, the projections 21 and 25 hook, respectively, underneath the housing lip 22 and into one of the positioning grooves 26a or 26b, so that the I part 18 is located in one of the positions A or B shown in FIG. 1B, and can be slidingly moved between these positions, as indicated by the double-headed arrow. The I part 18 is accessible, from outside the cassette housing, at webs 27 or 27' (web 27 is accessible in the embodiment shown in FIGS. 1A and 1B) and can be moved from A to B or in the reverse direction, for example by means of a tool, a fingernail, a ballpoint pen, etc.

Figure 1A:
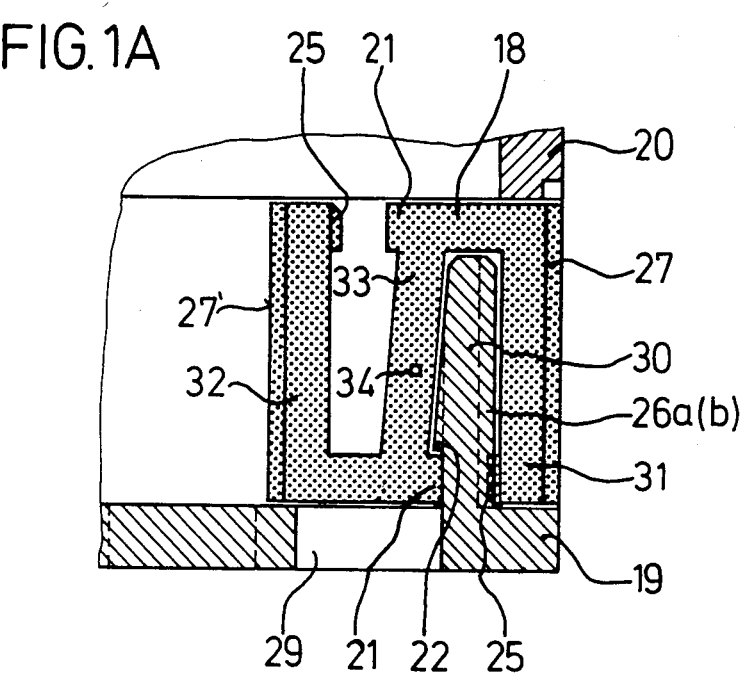
FIGS. 1A and 1B show a section and plan view of a novel identification element for a small cassette.

The I part 18 is symmetric about the central axis 34, so that it can be brought from a first position as in FIG. 1A into a second position, which is equivalent to the first position, by rotation about axis 34 through 180°. The interactions of projections 21 and 25 and ribs 22 and grooves 26a and 26b prevent, from the outset, the I part 18 from accidentally falling out or being displaced during or after assembly.

Figure 1B:
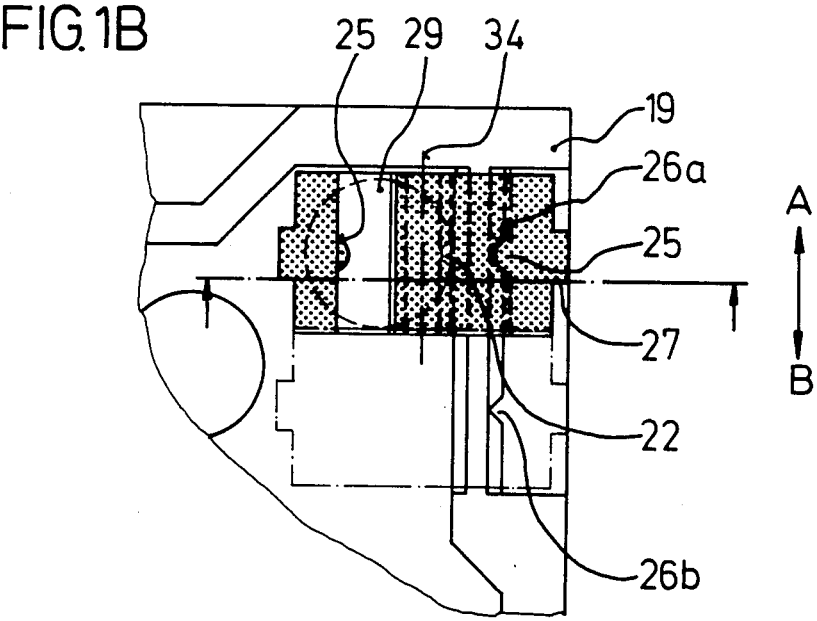

Another embodiment of the I part is shown in FIGS. 2A and 2B and is denoted by reference numeral 28. The I part 28 possesses an "S" form which has parallel free arms 36 and 37 and a middle part 38 which is at least substantially parallel to these arms. Parts identical to those in FIGS. 1A and 1B are denoted by the same reference numerals.

Compared with the I part 18, the arms 36 and 37 of I part 28 are extended with hook parts 23, which in turn carry the projections 25. The rear wall 30 is provided with an undercut edge 24, the hook part 23 hooking behind the said undercut edge and thus being locked in the vertical direction. Positioning grooves 35a and 35b are in a correspondingly low position, the projections 25 thus being able to engage in these grooves. The I part 28 is likewise symmetric about the central axis 34 and can therefore be used without difficulty in two identical mounted positions. The advantages stated for the I part 18 also apply to this embodiment.

Figure 4:
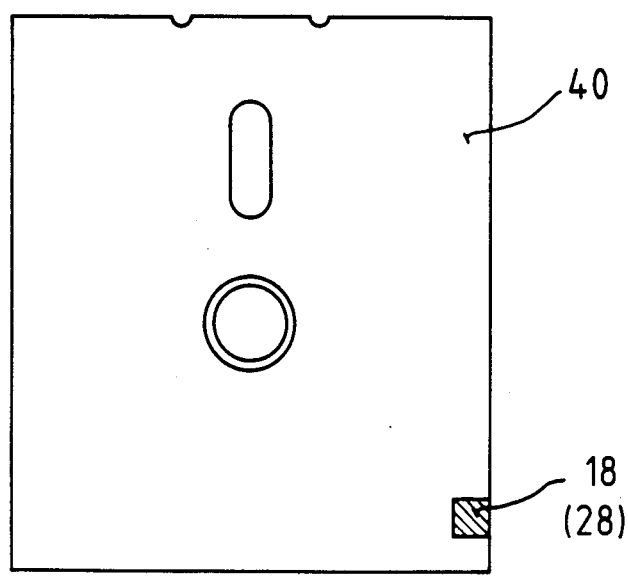
FIG. 4 shows a schematic plan view of a FlexyDisk®.

The identification parts 18 and 28 are usually employed as erase or write protections but may also be used for other identification purposes. The same forms in flatter embodiments can also be used for magnetic films or cassettes, and for example for diskettes 40 or microdiskettes as shown in FIG. 4.

The forms, furthermore, are not restricted to those described; for example, it is quite possible to use E, W and H forms since these can likewise be used in two positions. It is also possible to use symmetric forms having several symmetries about several axes, e.g. crosses, which can be installed in three or more positions. The I parts 18 and 28 and any other embodiments as claimed in the claims can easily be produced, including the extensions, projections and webs, from plastic or light metal by injection molding or die casting, respectively. The grooves and undercuts in the cassette housing can also readily be produced by injection molding.

During the installation of such I parts, the latter are hooked by one or more arms before the shell of the cassette housing is closed, and are thoroughly secured against falling out or slipping, since as light parts they are particularly susceptible. Hence, there is nothing to prevent the cassette shell from being transported open.

The symmetry about at least one axis of the shape of the I part, which permits it to be used in at least two different positions in the recording medium, is the minimum requirement for the purposes of the present invention. A symmetry about two or more axes as possessed by the stated cross shapes in all possible versions can of course also be used, and this permits an even larger number of mounted positions to be achieved.

We claim:

1. An envelope for enclosing a recording medium, said envelope having mounted thereon a part intended for identifying the recording medium or its recording, said part being mounted on said envelope in such a way that the position of said part can be altered, the envelope and the identification part being provided with interengaging means to prevent accidental detachment of the identification part from the envelope, wherein the identification part is a generally flat, N- or S-shaped unitary part comprising at least one pair of identical portions, said portions being symmetrical with respect to a central axis normal to the principal plane of the identification part, and at least one free end of the N- or S-shaped identification part engaging a wall of the envelope in its mounted position.

2. An identification part for use with an envelope for a recording medium, intended to identify the recording medium or the recording, and designed to be mounted on the envelope in such a way that the position of the identification part can be altered, said identification part having envelope-engaging means to prevent accidental detachment of the identification part from the envelope, wherein the identification part is a generally flat and at least approximately N- or S-shaped unitary part comprising at least one pair of identical curved or angled leg portions, said portions being symmetrical with respect to a central axis normal to the principal plane of the identification part and one or more of said portions of the identification part being designed to engage a wall of the envelope in its mounted position.

* * * * *